United States Patent
Dagh et al.

(10) Patent No.: US 7,600,824 B2
(45) Date of Patent: Oct. 13, 2009

(54) METHOD, ARRANGEMENT AND BRACKET FOR MOUNTING A RIM ACCESSORY ON A VEHICLE

(75) Inventors: Ingemar Dagh, Göteborg (SE); Anders Trygg, Onsala (SE)

(73) Assignee: Volvo Lastvagnar AB, Göteborg (SE)

(*) Notice: Subject to any disclaimer, the term of this patent is extended or adjusted under 35 U.S.C. 154(b) by 0 days.

(21) Appl. No.: 11/277,284

(22) Filed: Mar. 23, 2006

(65) Prior Publication Data

US 2006/0158020 A1 Jul. 20, 2006

Related U.S. Application Data

(63) Continuation of application No. PCT/SE2004/001456, filed on Oct. 12, 2004.

(30) Foreign Application Priority Data

Oct. 17, 2003 (SE) .................................. 0302758

(51) Int. Cl.
*B60B 7/12* (2006.01)
(52) U.S. Cl. ............................... 301/37.36; 301/37.102; 301/37.32
(58) Field of Classification Search ............ 301/37.101, 301/37.102, 37.31, 37.32, 37.34, 37.371, 301/37.35, 37.36, 37.106, 37.22, 37.23, 37.24, 301/37.33
See application file for complete search history.

(56) References Cited

U.S. PATENT DOCUMENTS

| | | | | |
|---|---|---|---|---|
| 3,480,329 A | * | 11/1969 | Foster et al. | 301/37.32 |
| 3,512,840 A | * | 5/1970 | Foster et al. | 301/37.32 |
| 3,894,775 A | * | 7/1975 | Christoph et al. | 301/37.35 |
| 4,007,967 A | * | 2/1977 | Buerger | 301/37.42 |
| 4,040,582 A | * | 8/1977 | Krauss | 244/103 S |

(Continued)

FOREIGN PATENT DOCUMENTS

EP 0149935 * 7/1985

(Continued)

OTHER PUBLICATIONS

International Search Report from corresponding International Application No. PCT/SE2004/001456.

*Primary Examiner*—Russell D Stormer
(74) *Attorney, Agent, or Firm*—WRB-IP LLP (57) ABSTRACT

The invention relates to a method for mounting rim accessories on a vehicle, the vehicle having rims with fasteners for fastening the rim to a wheel hub, the method including mounting of a bracket including at least two sections, the bracket having a first contact surface along its outer periphery for resting against an interesting contact surface on the inner periphery of the rim, the radially inner contact surface lying substantially parallel to and adjoining an axially outer edge of the rim. The method includes mounting the bracket such that adjoining end surfaces of the sections of the brackets are forced apart, thereby clamping the bracket fast to the rim, and mounting of an accessory on the bracket, the bracket having at least a second contact surface extending radially inwards along the inner periphery of the rim. The second contact surface is provided with at least two openings in each of the sections of the bracket for interaction with at least a corresponding number of fasteners on the accessory. The invention also relates to an arrangement for mounting such an accessory and a bracket intended for this purpose.

18 Claims, 5 Drawing Sheets

U.S. PATENT DOCUMENTS

| | | | | |
|---|---|---|---|---|
| 4,995,673 A * | 2/1991 | DuBost | ................... | 301/37.36 |
| 5,188,428 A | 2/1993 | Carter | | |
| 5,884,981 A * | 3/1999 | Ichikawa | ................. | 301/37.34 |
| 6,003,955 A * | 12/1999 | Ladd | ...................... | 301/37.34 |
| 6,585,330 B2 * | 7/2003 | Bruce | .................... | 301/37.372 |
| 6,637,833 B2 * | 10/2003 | Hsu et al. | .............. | 301/37.376 |
| 6,652,036 B2 * | 11/2003 | Mosher | ................. | 301/37.102 |
| 2003/0168906 A1 | 9/2003 | Mosher | | |

FOREIGN PATENT DOCUMENTS

| | | | | |
|---|---|---|---|---|
| EP | 0271381 A1 | 6/1988 | | |
| EP | 0430348 | * 6/1991 | .............. | 301/37.36 |

\* cited by examiner

METHOD, ARRANGEMENT AND BRACKET FOR MOUNTING A RIM ACCESSORY ON A VEHICLE

The present application is a continuation of International Application No. PCT/SE2004/001456, filed Oct. 12, 2004, which claims priority to SE 0302758-8, filed Oct. 17, 2003, both of which are incorporated by reference.

BACKGROUND AND SUMMARY

The invention relates to a method and an arrangement for quickly and easily mounting various rim accessories on a vehicle, the vehicle having rims with fasteners for fastening to a wheel hub on a drive wheel or on wheels intended for a trailer.

There are nowadays many different ways of fastening wheel caps to rims for vehicles, such as trucks and buses, having exposed fasteners for fastening rims.

U.S. Pat. No. 5,542,750, for example, shows a fastening in which a wheel cap is fastened directly or indirectly to a rim at least together with an annular disc having openings for the wheel nuts. The wheel cap is here screwed securely into said disc. A disadvantage with this design is that the wheel cap cannot be removed without tools, and that it only provides a limited protection against external influences.

U.S. Pat. No. 5,167,440 shows a fastening in which a clamping ring is fitted to existing holes in the rim, it in turn being possible to screw the wheel cap securely to the clamping ring. This solution also requires tools for removing the wheel cap. Furthermore, it does not afford any protection against external influences.

The problems with these known fastenings are that the mounted accessories cannot be removed quickly, since they require tools for detachment, and that they are intended for rims having exposed fasteners on an axially outer part of the rim. Only with difficulty can such fastenings be adapted to rims having fasteners on an axially inner part of the rim for fastening various accessories thereto. Examples of such rims are truck rims, especially rims for drive wheels or for a trailer. The problems described above are resolved by an arrangement and a bracket according to the invention.

It is desirable to provide an arrangement for quick and easy mounting of various rim accessories on a vehicle.

According to an aspect of the invention, a method for mounting rim accessories on a vehicle, the vehicle having rims with fasteners for fastening the rim to a wheel hub, is provided. The method comprises mounting of a bracket, the bracket having a first contact surface along its outer periphery for resting against an interacting contact surface on the inner periphery of the rim, the radially inner contact surface lying substantially parallel to and adjoining an axially outer edge of the rim, and mounting of an accessory on the bracket, the bracket having at least a second contact surface extending radially inwards along the inner periphery of the rim for interaction with at least two fasteners on said accessory.

The initial mounting of the bracket involves placing a circular unit adjoining the axially outer periphery of the rim. The bracket may preferably be constructed from a pair of semicircular sections, but may also comprise a single section or be assembled from three or four sections. According to one embodiment such an assembled bracket may comprise a number of identical sections. The bracket is mounted by placing said unit so that it rests against the inner periphery of the rim, at least one pair of paired adjoining end surfaces of the sections being forced apart by a suitable clamping element.

By pressing at least one pair of end surfaces apart in a tangential direction, a section or sections of the bracket will be expanded radially outwards until they come into contact with and are clamped securely against the inner periphery of the rim. Clamping is preferably undertaken against a slot or a radial edge on the inner periphery of the rim, for example at the so-called rim horn, said edge or slot preventing the bracket from being able to move in an axial direction relative to the rim after mounting. The contact surface of the bracket at its outer periphery preferably has a shape or a cross section matched to the contact surface of the rim. Fastening adjacent to the rim horn has the advantage that this surface is standardized on largely all types of rims. The bracket can thereby be provided with a fixed position that does not need to be subsequently adjusted.

Accessories such as a wheel cap or a protective cover can be mounted in that a number of fasteners on said accessory interact with a corresponding number of openings in the second contact surface of the bracket. When mounting a wheel cap the inner side of the wheel cap facing the rim interacts with the second contact surface of the bracket. The wheel cap fasteners interact with at least two openings in the second contact surface of the bracket remote from the hub, which openings may be arranged on an inner periphery of the second contact surface of the bracket. Alternatively, the fasteners interact with at least two openings that consist of through-holes in the second contact surface of the bracket. Any number of openings or holes may be selected from two upwards, and where appropriate are distributed evenly between the constituent section of the bracket. For example, the bracket may comprise two semicircular sections having five openings in each section, the bracket being capable of interacting with five fasteners on a wheel cap. The openings may consist of circular holes, semicircular, partially circular or elliptical openings, and combinations of these. In order to facilitate mounting of the wheel cap the number of openings may suitably exceed the number of fasteners on the wheel cap. For this purpose the wheel cap may also be provided with a number of guides for interaction with corresponding, further openings in the inner periphery of the bracket. The spacing both between openings (and/or holes) and fasteners should suitably be identical along the periphery of the bracket and the wheel cap respectively.

A protective cover can also be mounted in that a number of fasteners on said protective cover interact with at least two openings in the bracket. According to this embodiment the protective cover may rest against a side of the second contact surface facing the hub. The openings, as stated above, may be arranged on an inner periphery of the second contact surface of the bracket or of through-holes in the second contact surface of the bracket. The same openings or holes can therefore be used for fastening different types of accessories. A protective cover of this type is preferably mounted in order to protect the wheel hub, wheel bolts or exposed parts of the brake caliper and the like from external influences.

Fastening can be achieved, for example, by a sprung unit, such as a coil spring or spring clip placed between two end surfaces in a bracket formed by a divided circular section or between one or more pairs of end surfaces of two or more sections. If the bracket is made in one piece, one or more sprung units can be integrated into a circular section forming the bracket. By compressing at least one such sprung unit the bracket can be snapped into place on the rim. Alternatively, one or more pairs of end surfaces may be provided with an expandable unit in the form, for example, of a threaded bolt. The bolt may be located in an end surface, for interaction with a guide in the form of an opening in an opposing end surface.

After placing the bracket in the rim the bolt in contact with said opening is tightened, which means that the end surfaces are forced apart, clamping the bracket fast. If the bracket comprises two identical sections, both sections are suitably each provided with their own bolt and opening. A bracket comprising multiple sections may also be provided with an expandable unit, such as a bolt, and with hinges between the other end surfaces, so that the bracket can be clamped fast in one single operation.

An aspect of the invention also relates to an arrangement for mounting rim accessories on a vehicle, the arrangement comprising a rim mounted on a wheel hub with a number of fasteners, a bracket and an accessory. The bracket preferably comprises a first contact surface along its outer periphery, for resting against an interacting contact surface on the inner periphery of the rim, and at least a second contact surface extending radially inwards along the inner periphery of the rim for interaction with at least two fasteners on the wheel cap.

The bracket may comprise a divided circular section, or at least two semicircular sections, which form a circular unit. In this case the circular section or semicircular sections of the bracket comprise at least one pair of paired adjoining end surfaces provided with means for forcing at least one pair of end surfaces apart, as described above.

A wheel cap or a protective cover is provided with a number of fasteners on its axially inner or outer side, the fasteners interacting with openings or holes in the second contact surface extending radially inwards in the bracket. In this case the fasteners of the wheel cap or protective cover interact with at least two openings in the second contact surface of the bracket, as described above. The fasteners suitably comprise snap couplings, such as clips or similar arrangements that permit rapid detachment of the wheel cap.

BRIEF DESCRIPTION OF THE DRAWINGS

The invention will be described in more detail below with reference to exemplary embodiments shown in the schematic drawings attached, in which.

DETAILED DESCRIPTION

In the text below, unless otherwise stated the terms "inner" and "outer" relate to the location of various components in relation to a rim mounted on a vehicle axle, marked X. The terms "axial" and "radial" consequently relate to a location or extent in relation to the central axis of the rim, corresponding to the axle X.

Figure 1:
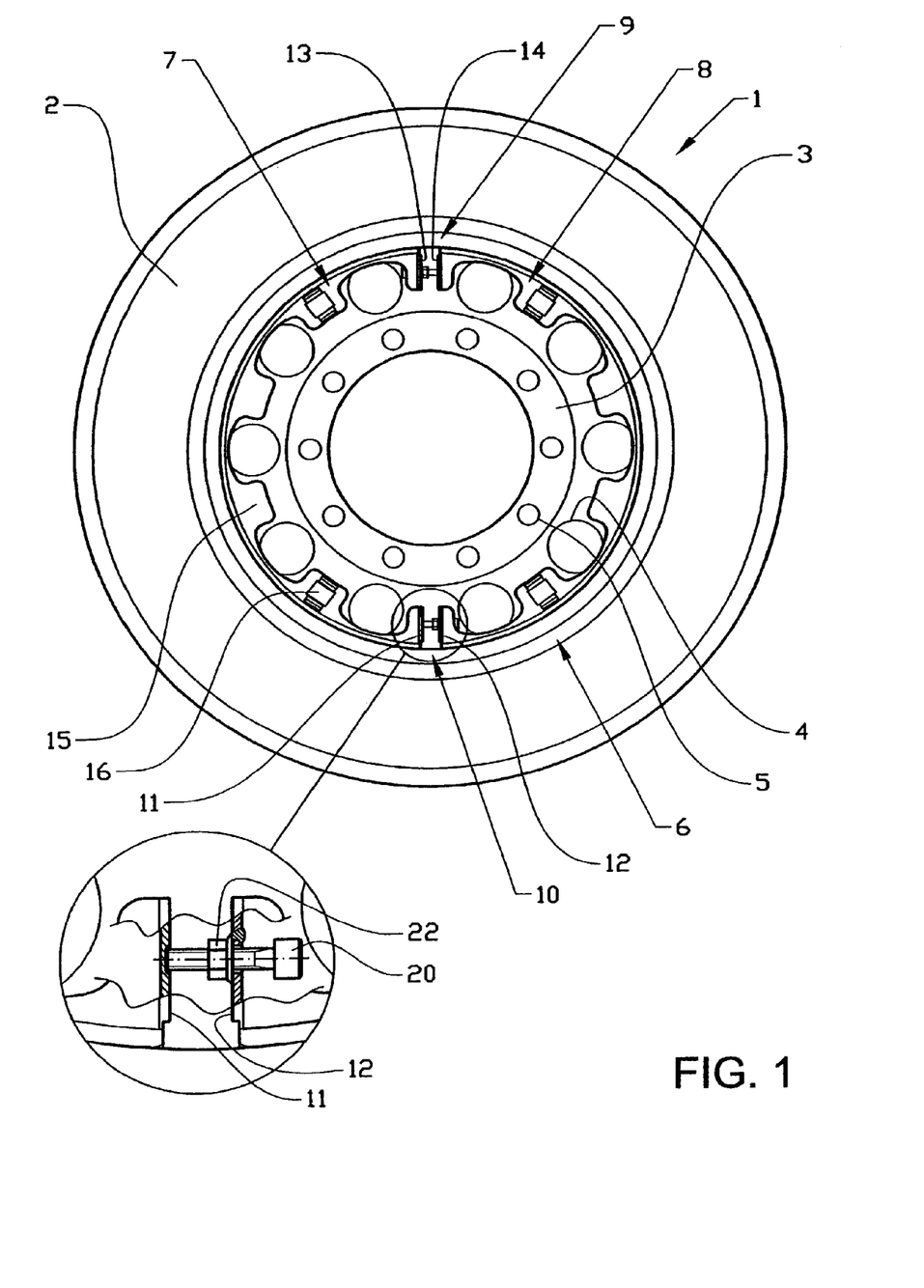
FIG. 1 shows a vehicle wheel having a bracket according to the invention.

FIG. 1 shows a vehicle wheel having a bracket according to the invention, in this case a rear drive wheel for a heavy truck or a bus. The wheel 1 comprises a tire 2, mounted on a rim 3, the rim being provided with a number of openings 4 and a central section having a number of holes 5 for wheel bolts (not shown) for mounting the wheel 1 on a wheel hub (not shown) on the vehicle. When mounting the wheel 1, a bracket 6 with a peripherally outer contact surface is placed so that it rests against an interacting inner contact surface on the inner periphery of the rim (see FIG. 2). The bracket 6 comprises a pair of semicircular sections 7,8 connected by a pair of clamping elements 9,10 located between paired adjoining end surfaces 11,12; 13,14 of the sections, which can be forced apart by means of the clamping elements 9,10. The bracket further comprises a number of axially outer contact surfaces 15 extending radially inwards, against which a wheel cap is intended to rest. A number of contact surfaces 15, in this case four, are provided with openings 16 for interaction with a corresponding number of clips on the wheel cap. The openings 12 are preferably punched in each contact surface, a radially inner or outer bent sheet metal edge extending axially inwards toward the rim. According to the present example the bracket 6 is provided with ten contact surfaces 15. Each section 7,8 comprises four contact surfaces 15 and said end surfaces 11,12; 13,14 facing the second section, the axially outward facing sides of the paired, mounted end surfaces of each section 7,8 forming a pair of further contact surfaces. Said end surfaces 11,12; 13,14 are bent largely at right-angles to the respective contact surface.

The bracket is preferably made of 0.5-3 mm sheet metal, for example sheet steel or aluminum, although a molded composite plastic material is also feasible.

Figure 2:
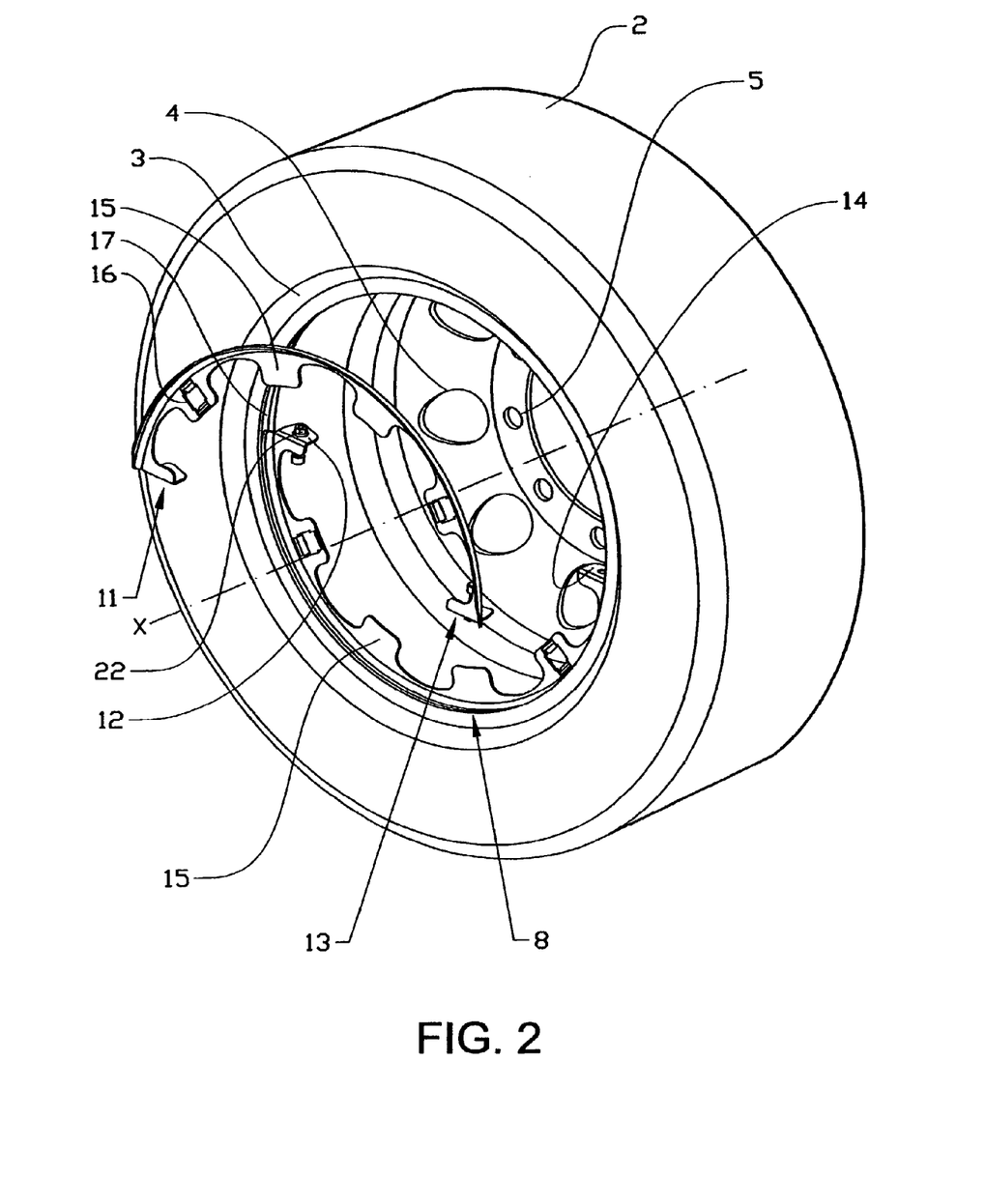
FIG. 2 shows a vehicle wheel having a divided bracket according to a preferred embodiment of the invention.

FIG. 2 shows a vehicle wheel having an axis of rotation X, the wheel being provided with a divided bracket having two sections 7,8 according to a preferred embodiment of the invention. The figure shows a section 8 placed in contact with an axially outer and radially inner contact surface 17 on the rim 3, said contact surface preferably being situated on the horn of the rim. Each section 7 is provided with an interacting radially outer contact surface 18. The interacting contact surfaces of the rim and the sections prevent the assembled bracket from shifting axially after mounting and clamping. The contact surfaces 18 of the bracket sections 7,8 at the outer periphery of the bracket 6 preferably have a shape or a cross section matched to the inner contact surface 17 of the rim 3.

Figure 3:
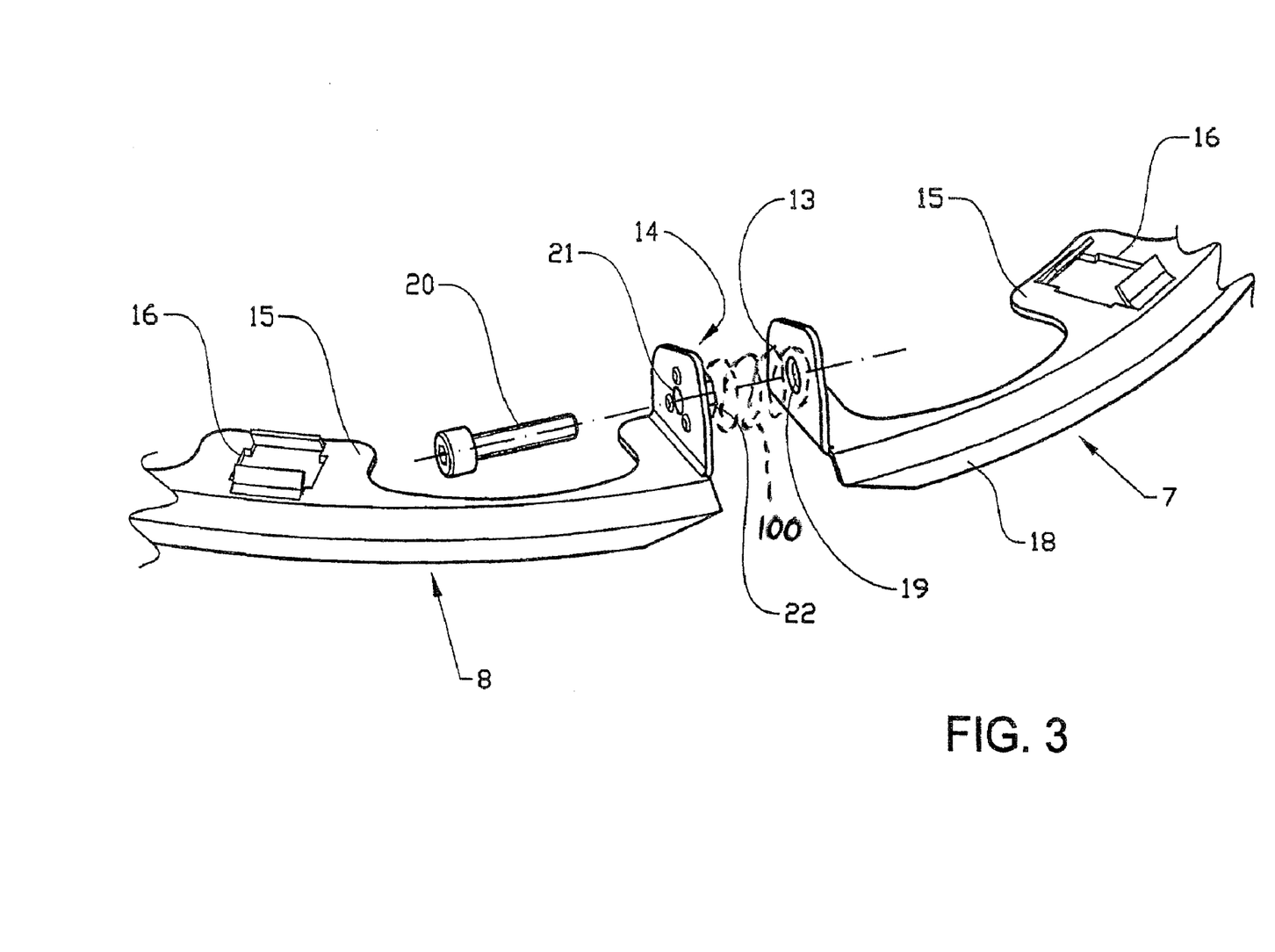
FIG. 3 shows a clamping arrangement for a bracket according to one embodiment of the invention.

FIG. 3 shows a clamping arrangement for a bracket according to one embodiment of the invention. The figure shows a view of a part of the rear side of the bracket, viewed from the axially inner side of the rim. Each section 7,8 in this case have a pair of laterally inverted, substantially symmetrical end surfaces 13,14. The first end surface 13 is provided with a depression or a recess 19, intended to interact with a front part of clamping element 20, preferably in the form of a bolt. The second end surface 14 is provided with a through-hole 21, and with a threaded section, preferably in the form of a nut 22 (hidden, see FIG. 1/2) firmly welded to the side facing the first end surface 13. Fastening can be also achieved, for example, by a sprung unit, such as a coil spring or spring clip 100 (shown in phantom in FIG. 3) placed between two end surfaces in a bracket formed by a divided circular section or between one or more pairs of end surfaces of two or more sections.

Once the respective sections 7,8 have been placed in contact with the rim 3, each bolt 20 is tightened. When each bolt 20 comes into contact with the respective recess 19 in an opposing end surface 13,14 the sections 7,8 will be forced radially outwards and firmly clamped in relation to the rim 3.

Figure 4:
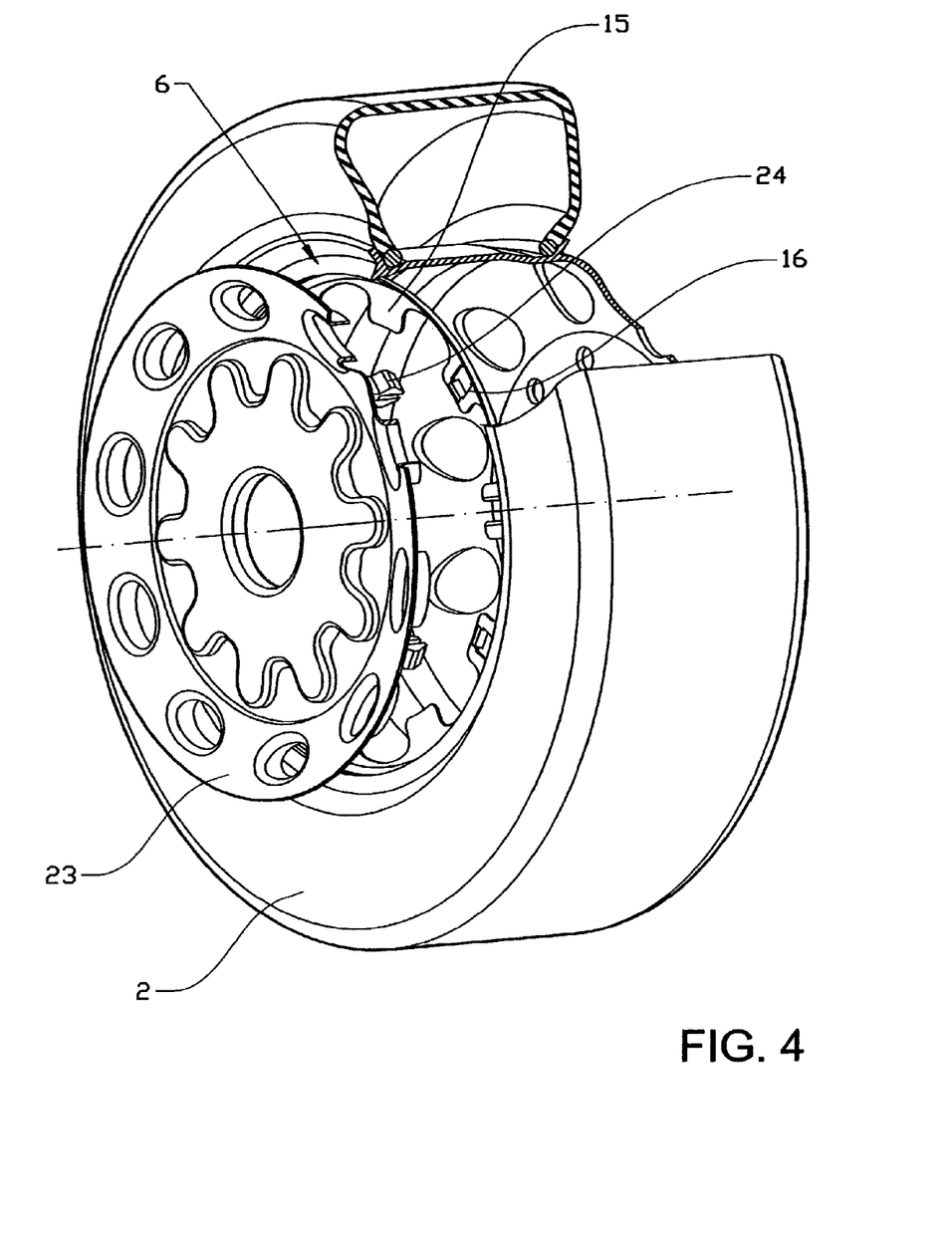
FIG. 4 shows a bracket and a wheel cap according to one embodiment of the invention.

FIG. 4 shows a bracket and a wheel cap according to one embodiment of the invention. The bracket 6 constitutes a fastening for a wheel cap 23, which has been provided with a suitable design shape to match the diameter of the rim 3 and the bracket 6. On its inner surface the wheel cap 23 is provided with four clips 24 for detachable mounting of the wheel cap 23 on the corresponding openings 16 of the bracket 6. The clips may be formed from a bent sheet metal profile having a pair of legs extending axially inwards, which interact with a pair of corresponding edges of each opening 16 in the bracket 6. Alternatively the clips may comprise a pair of protruding, sprung profiles of a suitable plastic material. The number of clips and openings can be varied having regard to the gripping force that is exerted on the bracket by different types of clip.

Figure 5:
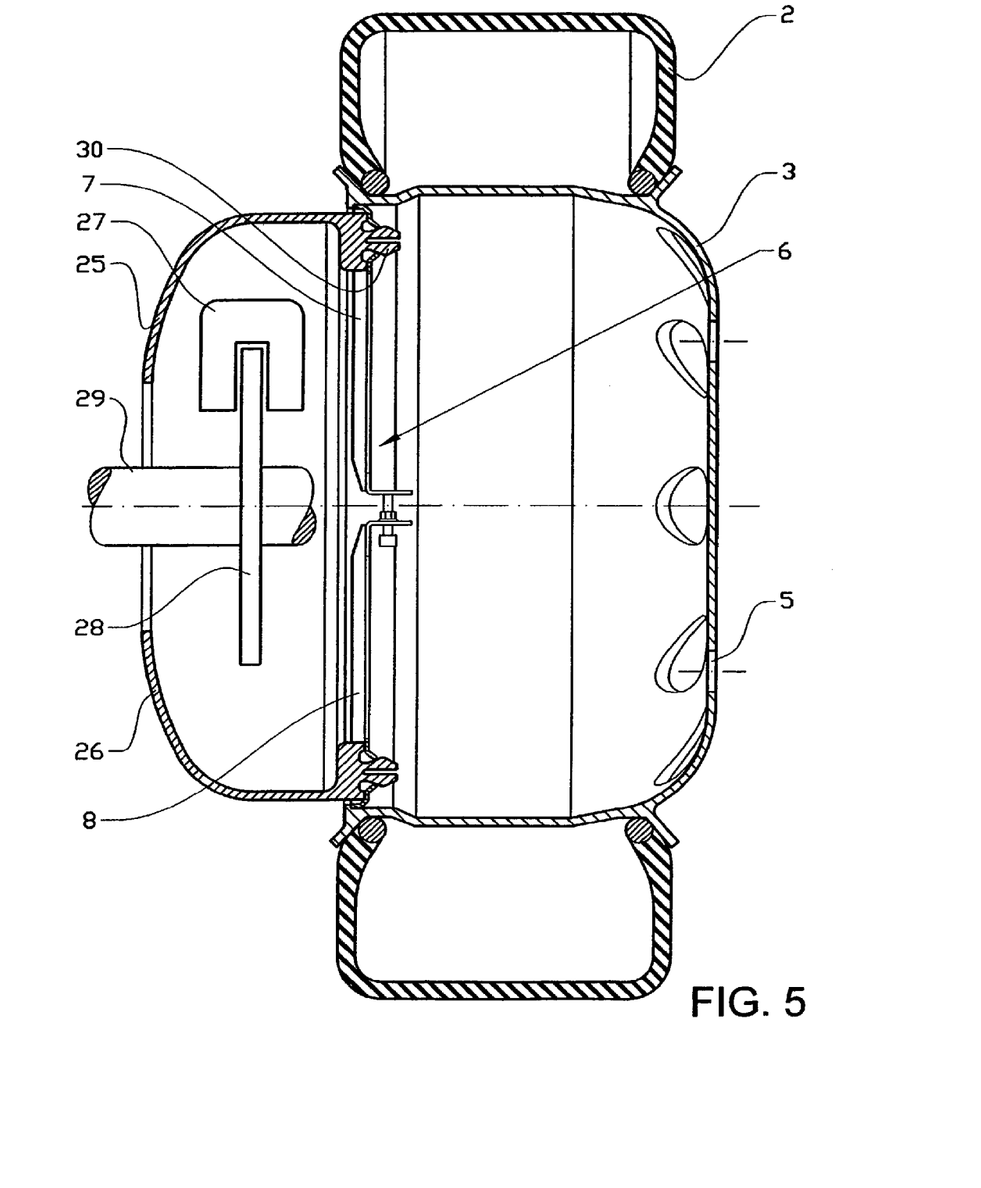
FIG. 5 shows a bracket and a protective cover according to an alternative embodiment of the invention.

The clips can be fastened to the wheel cap by screwing, riveting, adhesive bonding or spot-welding, depending on the material of the clips and the wheel cap. The clips can also be molded into the material if a plastic material is used in the wheel cap. The number of clips may vary from two upwards depending on the type of clip and the forces to which the wheel cap is likely to be exposed. FIG. 5 shows a bracket and a protective cover according to a further embodiment of the invention. The bracket 6 constitutes a fastening for a protective cover 25,26, which have been provided with a suitable design shape to protect a brake caliper 27 for a brake disc 28 on the wheel axle 29 in question, these parts being represented only schematically. The cover is in this case divided into two halves 25,26 so that it can be mounted around the wheel axle having a brake caliper for a so-called "super single" wheel, in which a single wheel replaces a standard double assembly arrangement. The cover may also comprise one part. According to alternative embodiments the cover can be sealed off against the wheel axle, and/or provided with vents along its periphery in order to ventilate the brake disc. By giving the vents a suitable aerodynamic shape, the rotation of the wheel can help to increase the through-flow of air past the brake disk. The cover may naturally also be endowed with other design shapes in order to protect the wheel hub, the rim fasteners or other equipment mounted in or adjacent to the rim. The latter comprises a wide single-mounted wheel intended to replace a double-mounted wheel.

According to the embodiment in FIG. 5 the protective cover 25,26 is mounted against the axially outer side of the bracket 6, fixed to the axially inner side of the rim. A number of clips or snap couplings 30 on an axially outward-facing radial edge surface of the protective cover 25 are pressed through corresponding openings in contact surfaces 15 of the bracket 6, as shown in the cut-away part of FIG. 5.

According to an alternative embodiment a protective cover is mounted against the side of the bracket 6 facing the rim, that is to say between the bracket 6 and the central section of the rim. A number of clips on a radial edge surface of a protective cover facing the bracket are pressed inwards through corresponding openings in contact surfaces of the bracket 6, as shown in FIG. 5. Depending on the design of the clips, the sheet metal edges of the openings in the contact surfaces of the bracket may need to be turned over, which can be done by turning the bracket over or manufacturing the bracket with sheet metal edges turned away from the rim. This fastening is preferably suitable for protective covers that are mounted on the axially inner part of the rim, around a wheel axle, but may naturally also be adapted for mounting on the axially outer part of the rim.

The fastening, shape and number of the clips may be chosen according to the type of clip and the forces to which the wheel cap is likely to be exposed, as described above. The protective covers in FIGS. 4 and 5 are only shown in schematic form and may be provided with any shape depending on the purpose of the cover.

The embodiments according to FIGS. 1-5 are intended for wheel bolts, but fasteners in the form of wheel nuts are naturally also possible.

The protective cover is preferably made from a plastic material but can also be composed of a plastic material having an internal sheet metal reinforcement, or entirely of sheet metal of a suitable metal and a suitable thickness.

The examples above describe only one type of clip, the two tongues of which are designed to interact with diametrically opposing edges in a preferably circular opening. Alternative embodiments may comprise clips having only on tongue, which snaps around a radially inner or outer edge of two or more openings, or around a radially inner or outer peripheral edge of the second contact surface of the bracket.

The exemplary embodiments above are primarily intended for heavier vehicles, such as trucks and buses, but can also be applied to light trucks, automobiles and other types of vehicle with exposed wheel bolts or wheel nuts.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A method for mounting rim accessories on a vehicle, the vehicle having rims with fasteners for fastening the rim to a wheel hub, the method comprising:

mounting a bracket comprising at least two sections, the bracket having a first contact surface along an outer periphery of the bracket for resting against an interacting contact surface on a radially inner periphery of the rim, the contact surface of the rim lying substantially parallel to and adjoining an axially titer edge of the rim, each bracket section having end surfaces, an end surface of one bracket section defining, with a proximate end surface of the other bracket section, adjoining end surfaces;

mounting the bracket such that the adjoining end surfaces are forced apart, thereby clamping the bracket to the rim, each bracket section having a shape matching the contact surface of the rim before and after clamping the bracket to the rim; and mounting an accessory on the bracket, the bracket having at least a second contact surface extending radially inward along the inner periphery of the rim, the second contact surface being provided with at least two openings in each of the sections of the bracket for interaction with at least a corresponding number of fasteners on the accessory, wherein the sections of the bracket are discrete and are held in place relative to each other only by clamping elements at the adjoining end surfaces, the rim, and the accessory, the accessory being removably attached to the bracket by the fasteners.

2. The method as claimed in claim 1, wherein fasteners of the accessory interact with at least two openings in the second contact surface of the bracket, the openings being arranged in an inner peripheral edge of a second contact surface of the bracket.

3. The method as claimed in claim 1, wherein fasteners of the accessory interact with at least two openings in the second contact surface of the bracket, the openings comprising through-holes in a second contact surface of the bracket.

4. The method as claimed in claim 1, wherein the accessory is a wheel cap.

5. The method as claimed in claim 1, wherein the accessory is a protective cover.

6. The method as claimed in claim 1, wherein the adjoining end surfaces are forced apart with at least one of a screw arrangement and a spring.

7. An arrangement for mounting rim accessories on a vehicle, the arrangement comprising:
 a rim mounted on a wheel hub with a number of fasteners;
 a bracket; and
 an accessory, wherein the bracket comprises at least two sections and comprises a first contact surface along an outer periphery of the bracket for resting against an interacting contact surface on an inner periphery of the rim, and at least a second contact surface extending radially inward along the inner periphery of the rim provided with at least two openings in each section of the bracket for interaction with a corresponding number of fasteners on the accessory, each bracket section having a shape matching the contact surface of the rim before and after clamping the bracket to the rim,
 wherein the sections of the bracket are discrete and are held in place relative to each other only by clamping elements at the adjoining end surfaces, the rim, and the accessory, the accessory being removably attached to the bracket by the fasteners.

8. The arrangement as claimed in claim 7, wherein fasteners of the accessory interact with at least two openings in a second contact surface of the bracket, the openings being arranged in an inner peripheral edge of the second contact surface of the bracket.

9. The arrangement as claimed in claim 7, wherein fasteners of the accessory interact with at least two openings in a second contact surface of the bracket, the openings comprising through-holes in the second contact surface of the bracket.

10. The arrangement as claimed in claim 7, wherein the accessory is a wheel cap.

11. The arrangement as claimed in claim 7, wherein the accessory is a protective cover.

12. The arrangement as claimed in claim 7, wherein the fasteners of the accessory comprise snap couplings.

13. The arrangement as claimed in claim 7, wherein the fasteners of the accessory comprise clips.

14. The arrangement as claimed in claim 7, comprising at least one of a screw arrangement and a spring for forcing the adjoining end surfaces.

15. A bracket for mounting rim accessories on a vehicle, the rim being intended for mounting on a wheel hub with a number of fasteners, the bracket comprising:
 at least two sections;
 a first contact surface along an outer periphery of the bracket for resting against an interacting contact surface on an inner periphery of the rim, each bracket sect on having a shape matching the contact surface of the rim before and after clamping the bracket to the rim; and
 at least a second contact surface extending radially inward along the inner periphery of the rim provided with at least two openings in each section of the bracket for interaction with a corresponding number of fasteners on the accessory,
 wherein the sections of the bracket are discrete and, prior to fastening a discrete accessory to the bracket, the sections are held in place dative to each other only by clamping elements at the adjoining end surfaces and the rim.

16. The bracket as claimed in claim 15, wherein the bracket comprises at least two pairs of adjoining end surfaces provided with means for forcing the end surfaces apart.

17. The bracket as claimed in claim 15, wherein the means for pressing the end surfaces apart comprises a bolt.

18. The bracket as claimed in claim 15, wherein the means for pressing the end surfaces apart comprises a spring.

* * * * *